P. SIPTROTT.
MOLD.
APPLICATION FILED AUG. 7, 1917.
1,270,886.
Patented July 2, 1918.
2 SHEETS—SHEET 1.
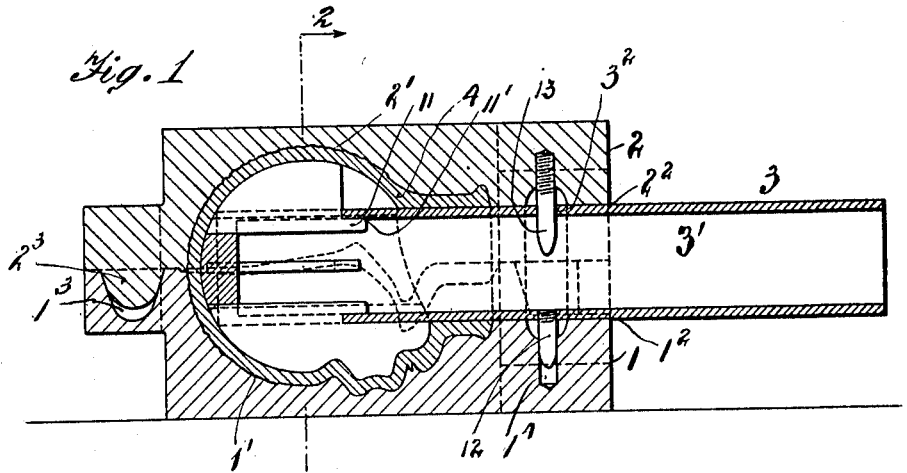
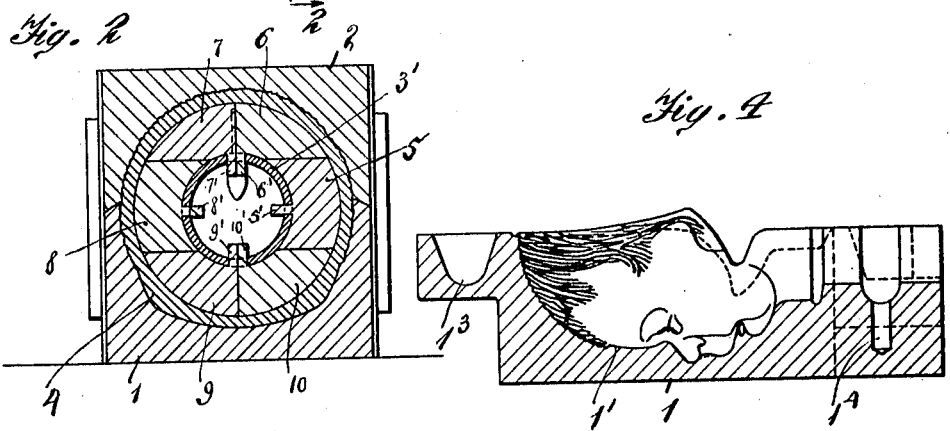
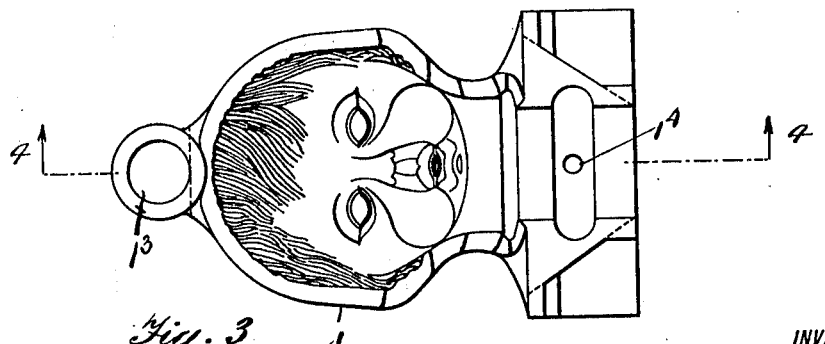
INVENTOR
Paul Siptrott
BY
Mark Ordmann
ATTORNEY P. SIPTROTT.
MOLD.
APPLICATION FILED AUG. 7, 1917.
1,270,886.
Patented July 2, 1918.
2 SHEETS—SHEET 2.
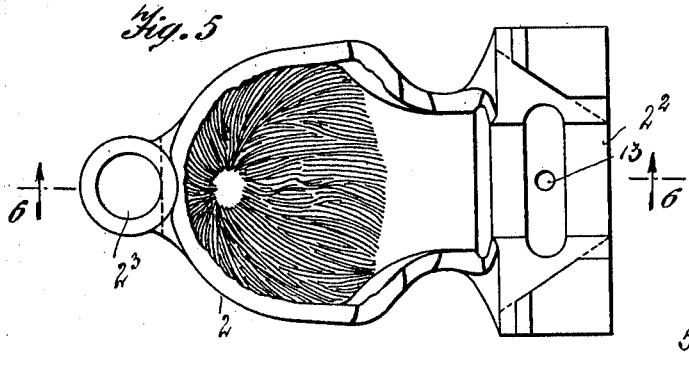
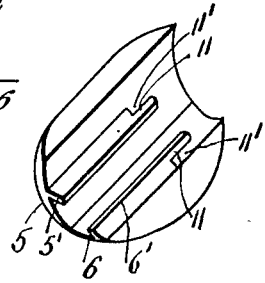
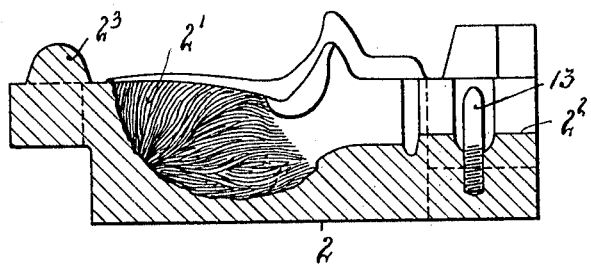
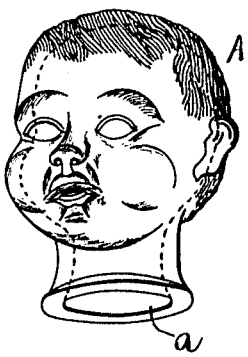
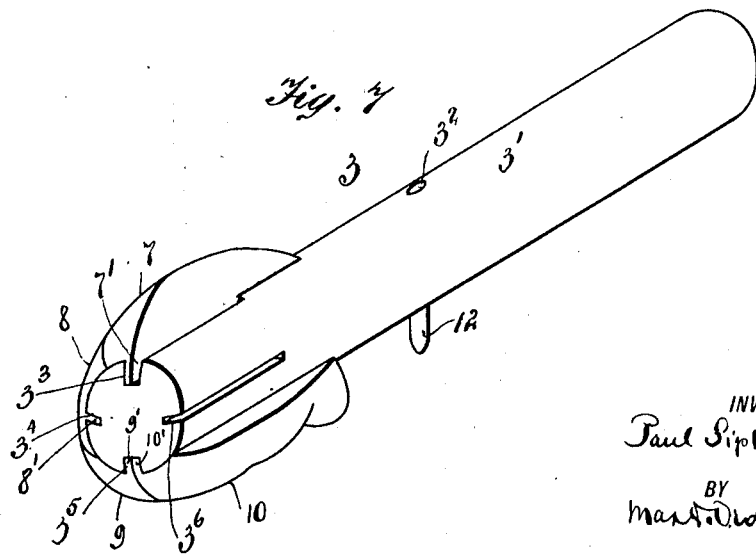
INVENTOR
Paul Siptrott
BY
Mark T. Dedman
ATTORNEY

UNITED STATES PATENT OFFICE.

PAUL SIPTROTT, OF NEW YORK, N. Y.

MOLD.

1,270,886.  Specification of Letters Patent.  Patented July 2, 1918.

Application filed August 7, 1917. Serial No. 184,823.

*To all whom it may concern:*

Be it known that I, PAUL SIPTROTT, a subject of the German Emperor, residing at New York, county of New York, and State of New York, have invented certain new and useful Improvements in Molds, of which the following is a specification.

The present invention relates to means for forming objects from plastic material and more particularly to an apparatus for producing hollow dolls' heads or similar objects.

With apparatus for this purpose a mold is used which consists of flasks and a core and the plastic material is packed in the flasks to fill the annular space between them and the core. After the work is completed, the core must be removed from within the object. With the hitherto used construction the removal of the core presents some difficulties, as the core has to be so to say chopped out from within the body which work is not only tedious but also requires a certain skill in order to avoid damage to or disfigurement of the object.

The object of my invention is to obviate this drawback which I accomplish by constructing the core of individual sections and so forming them that on the withdrawal of a single part, all other parts of the core become loose or separated and can be easily and readily shaken out from within the hollow object when completed.

Another object of my invention is to provide a core which will be durable and the sections of which will be sufficiently strong to resist the high pressure which must be exerted thereon to produce the object.

A further object of my invention is to provide effective means to hold the individual sections of the core together while in use preventing their accidental displacement relative to one another.

A still further object of my invention is to provide means which will insure the position of the core within the mold during the operation and yet enable its speedy removal therefrom.

With these and other objects in view my invention consists in the construction, arrangement and combination of parts as will be hereinafter more fully described and set forth in the appended claims.

In the accompanying drawing in which similar reference characters denote corresponding parts, Figure 1 is a longitudinal vertical section of the mold showing all the parts assembled for use; Fig. 2 is a cross section on line 2—2 of Fig. 1; Fig. 3 is a top plan view of the lower section of the mold; Fig. 4 is a longitudinal section on line 4—4 of Fig. 3; Fig. 5 is a bottom plan view of the upper section of the mold; Fig. 6 is a longitudinal section on line 6—6 of Fig. 5; Fig. 7 is a perspective view of the core with some sections thereof removed; Fig. 8 is a perspective view of the removed sections; and Fig. 9 represents the completed object.

The mold is composed of two flasks 1 and 2 and a central body or core 3. The inner surfaces $1^1$ and $2^1$ of the flasks are each formed with impressions which together constitute the object in intaglio, each one representing one-half thereof, while the core is designed to represent the object in relief. In the example shown where the article to be produced is a doll's head, the impressions on the inner surfaces of the flasks are so formed that the head appears to be lying face down with the neck extending toward one end of the mold. A part of the core is adapted to extend outwardly through one end of the flasks, and to this end the two flasks which when in use are placed on top of one another and have their bearing edges or surfaces shaped to form with one another a tight closure, are at their ends $1^2$ and $2^2$ where the core passes outwardly cut out to conform with the periphery of the latter. At the opposite end one of the flasks, as 1, has a socket $1^3$ and the other flask 2 a projection or boss $2^3$ to engage with one another and hold the two flasks in proper position relative to one another.

The core 3 is a sectional piece, the same being composed of a central tubular part $3^1$ and a number of sections clustered around one end thereof. The tube $3^1$ is of such a length that when placed into the mold in operative position, it will project outwardly therefrom. The inner end of the tube is closed and as will be seen later its outer surface serves to compose with the sections mounted around the tube the core proper. Extending from the closed end of the tubing $3^1$ in longitudinal direction, are a number of incisions or recesses $3^3$, $3^4$, $3^5$, and $3^6$ suitably distributed around the periphery thereof. These recesses are shorter than the length of the part of the tubing which is located between the intaglioed portions of the flasks and serve for the engagement of the different outer sections mounted around the tube. In the present example the head of the core is divided into six sections 5, 6, 7, 8, 9 and 10, of which sections 9 and 10 make up the face, 6 and 8, the sides, and 7 and 6 the back of the head. These sections are solid pieces adapted to extend from the closed end of the tube to a point where the neck of the head begins. The part of the tube which is not embraced by the sections and extends to the outer ends of the impression $1^1$ and $2^1$ serves as the neck portion of the core proper. The number of divisions of course, is arbitrary, but care must be taken that the individual sections each be somewhat smaller in width than the width or diameter of the central part $3^1$ so that they may freely pass through the opening $a$ formed in the neck of the completed head A (Fig. 9). These sections when properly assembled around the inner end of the tubing must bear with their inner surfaces closely on the periphery of the tubing and with their side surfaces against their neighboring sections, so as not to leave any crevice through which the plastic material during the molding process may be forced in. In the present example the outer face of the closed end of the tubing is utilized to form a part of the core proper and to this end it is spherically shaped to serve as the top of the head. When viewed from that end the different sections mounted around the tubing appear as a cluster around the said top which forms the center.

For securing the sections in position on said central tubing, each is provided on its bottom with a rib or flange extending longitudinally thereof and which are adapted to engage the recesses heretofore referred to. In the example shown the upper and lower sections have their flanges arranged at their inner edges, as $6^1$, $7^1$, $9^1$, and $10^1$, so that the flanges of two adjoining sections will abut against each other throughout their length, while each of the two side pieces 5 and 8 are formed with centrally extending ribs $5^1$ and $8^1$ respectively. The recesses in the tubing engaging these ribs or flanges are made of variable width. Thus the recesses $3^3$ and $3^5$ for the upper and lower sections are sufficiently wide to each engage snugly the ribs of two adjoining sections, while the recesses $3^4$ and $3^6$ each engage a single rib of the corresponding sections. At their lowest ends, or the ends nearer the neck portion of the head the ribs or flanges are each milled or cut in to form hook shaped projections 11, the cut out parts $11^1$ being of such a width as to correspond with the thickness of the wall of the tubing $3^1$, so that the sections when being mounted in position can be moved longitudinally or downwardly until their hooked ends will engage the wall of the tubing. The length of the hook may be made longer than shown, preferably, about equal to half the length of its respective section in order that it may firmly hold the latter in position and tightly against the tubing. The longitudinal recesses in the tubing $3^1$ being open at the inner or closed end of the tube will permit the sections to be inserted from these open ends.

In order to secure the core within the mold a pin 12 or the like may be provided to project downwardly from the tubing $3^1$ and to engage a bore $1^4$ provided in the flask 1. Similarly the upper flask 2 may be provided with a pin 13 or the like which projects downwardly and is adapted to pass into the tubing through an opening $3^2$ thereof.

In use, the lower flask is filled with a quantity of the plastic material 4, whereupon the core, the parts which have been previously properly assembled, is placed on top of the material and pressed down until it rests on the cut out edge $1^2$ and its pin 12 engages the bore $1^4$ in said flask. Under the pressure the excess material will be forced out from the flask. Then a fresh quantity of the material is packed around the core and the upper flask placed in position and pressed down until it becomes engaged with the lower flask.

When the article is completed, the core on being removed from the mold can be separated into its individual sections by simply pulling out the central part $3^1$ from within the body A, which will cause the different sections thereon which are held back by the surrounding walls of the formed object to slide off and thus become separated within the hollow of the object. By holding the latter with its opening $a$ down and shaking it a little the pieces will easily fall out one by one.

It is obvious that the construction described and shown represents only one embodiment of my invention and that the principle of my invention is applicable to the production of other objects than doll's heads. I therefore do not wish to restrict myself to the details of this construction, since the same may variously be modified without departing from the principle of my invention.

What I claim and desire to secure by Letters Patent is:

A core for molding dolls' heads comprising a hollow tubular section closed at its inner end and provided with a number of longitudinal incisions or recesses, a number of external sections clustered around said tubular section and each formed with an inner flange having a hooked portion to fit in said recesses and to engage the inner surface of said tubular sections so as to be locked in position, the flanges of the upper and lower sections being arranged at their inner edges so that those of two adjoining sections will abut against one another and the flanges of the lateral sections being arranged substantially centrally, the longitudinal recesses for the ribs of the upper and lower sections being of a width corresponding to the total thickness of the flanges of two adjoining sections.

In testimony whereof, I affix my signature in the presence of two witnesses.

PAUL SIPTROTT.

Witnesses:
FRED J. GRIESMER,
MAX D. ORDMANN.

Copies of this patent may be obtained for five cents each, by addressing the "Commissioner of Patents, Washington, D. C."